US005669060A

United States Patent [19]
Guimont

[11] Patent Number: 5,669,060
[45] Date of Patent: Sep. 16, 1997

[54] METHOD AND APPARATUS FOR ENHANCING CALL SET-UP AND HANDOFF QUALITY

[75] Inventor: Vincent Guimont, Blainville, Canada

[73] Assignee: Telefonaktiebolaget L M Ericsson (publ), Stockholm, Sweden

[21] Appl. No.: 610,425

[22] Filed: Mar. 4, 1996

[51] Int. Cl.⁶ .............................. H04Q 7/00; H04Q 9/00
[52] U.S. Cl. ........................ 455/436; 455/62; 455/134; 455/513
[58] Field of Search ................... 455/33.1, 33.2, 455/37.1, 62, 134, 277.1, 277.2, 56.1, 34.1, 33.3, 34.2, 53.1, 54.2, 8, 9; 379/59–60

[56] References Cited

U.S. PATENT DOCUMENTS

| | | |
|---|---|---|
| 4,704,734 | 11/1987 | Menich et al. . |
| 4,737,978 | 4/1988 | Burke et al. . |
| 4,932,049 | 6/1990 | Lee . |
| 5,097,484 | 3/1992 | Akaiwa . |
| 5,117,236 | 5/1992 | Chang et al. . |
| 5,138,327 | 8/1992 | Chang et al. ........................ 455/134 |
| 5,175,878 | 12/1992 | Davis et al. . |
| 5,193,109 | 3/1993 | Lee . |
| 5,355,522 | 10/1994 | Demange ............................. 455/62 |
| 5,384,826 | 1/1995 | Amitay . |
| 5,481,571 | 1/1996 | Balachandran et al. .............. 455/134 |
| 5,548,809 | 8/1996 | Lemson ............................. 455/34.1 |

*Primary Examiner*—Chi H. Pham
*Assistant Examiner*—Gertrude Arthur
*Attorney, Agent, or Firm*—Jenkens & Gilchrist P.C.

[57] ABSTRACT

In a cellular telephone system, mobile station measurements of received signal strength on each reference frequency are made in order to select a cell. At call set-up in or handoff to that cell, a voice frequency is selected by the system to carry the communication. A determination is then made as to whether the antenna used for the reference frequency is the same as that used by the selected voice frequency. From this determination, actions are taken as needed to address concerns over potential differences in broadcast coverage areas for the antennas. For example, an alternate voice frequency using the same antenna as the reference frequency may be chosen. Further, a test broadcast may be made on the selected voice frequency for comparison to the received signal strength on the reference frequency in order to confirm the selection of the cell and use of the selected voice frequency.

21 Claims, 3 Drawing Sheets

METHOD AND APPARATUS FOR ENHANCING CALL SET-UP AND HANDOFF QUALITY

BACKGROUND OF THE INVENTION

1. Technical Field of the Invention

The present invention relates to cellular telephone systems and, in particular, to a method and apparatus for enhancing call set-up and handoff quality by accounting for the differing broadcast coverage characteristics of the plural antennas used by cellular telephone system base stations.

2. Description of Related Art

Reference is now made to FIG. 1 wherein there is shown a schematic view of a cellular telephone system 10 including a plurality of individual cells 12. Each cell 12 operates with a different assigned set of transmission frequencies f selected from the cellular frequency band. The set of frequencies assigned to each cell 12 includes at least one control frequency $f_c$ operable in either or both an analog and/or a digital mode, and a plurality of voice frequencies $f_v$ also operable in either or both an analog and/or a digital mode. Sets of assigned frequencies are usually (but not necessarily) different for adjacent cells 12, and such sets are not repeated except for cells that are far enough away from each other to minimize the likelihood of adjacent or co-channel interference.

A base station 14 including a plurality of transceivers (not shown) capable of operating independently on each of the assigned set of frequencies is provided for each of the cells (one set of frequencies per base station). Via the transceivers, the base stations 14 engage in simultaneous communications with plural mobile stations 16 operating within the area of the associated cell 12. The control frequencies $f_c$ in the set of frequencies assigned to each cell 12 are used to carry system control signals between the base station 14 and proximately located mobile stations 16. Such control signals include page signals, page response signals, location registration signals, voice channel assignments, maintenance instructions, and cell selection or reselection instructions. The plurality of voice frequencies $f_v$ in the set of frequencies assigned to each cell 12 are used to carry subscriber voice or data communications between the base station 14 and proximately located mobile stations 16.

The base stations 14 further communicate via data links (and voice trunks) 22 with a central control station, commonly referred to as a mobile switching center 18, which functions to control operation of the system 10. In particular, the mobile switching center 18 operates to selectively connect subscriber voice and data communications to the mobile stations 16 through the base stations 14. Thus, the mobile switching center 18 controls system operation through and in response to the transmission of control signals over the control frequencies $f_c$ to set-up on the voice frequencies $f_v$ calls that are either originated by or terminated at the mobile stations 16. The mobile switching center 18 further controls, through and in response to control (pilot) frequency $f_c$ transmissions, and measurements on voice frequencies $f_v$, the handoff of a subscriber communication from a voice frequency $f_v$ of one cell 12 to a voice frequency $f_v$ of another cell as the subscriber mobile station 16 roams throughout the cellular service area during an ongoing communication.

At call set-up, for example when a subscriber originates a call from a mobile station 16 or the system 10 receives a call to be terminated at the subscriber, the mobile station has already selected a cell 12 and base station 14 through which a call originated by or terminated at the mobile station is to be transmitted. What has not yet been selected, however, is the particular one of the voice frequencies $f_v$ to carry the call. This frequency selection is made from the currently unused voice frequencies $f_v$ within the set of voice frequencies $f_v$ assigned to that cell 12 which was selected by the mobile station 16.

During an ongoing call, the communication is already being carried by one selected voice frequency $f_v$. As the mobile station 16 roams around the broadcast coverage area of a currently serving cell 12, the mobile station makes signal strength measurements on a measurement channel (constantly transmitting pilot frequency) for each of its neighboring cells. When the mobile station roams out of the currently serving cell, the signal strength measurement on the measurement channel of one of the neighboring cells exceeds the received signal strength on currently used voice frequency $f_v$. At that point, the mobile station 16 makes a request of the cellular system for a handoff. The mobile station made measurements are reported back to the mobile switching center 18, and a new cell 12 and base station 14 are selected based on the measured signal strengths to handle the call. A voice frequency $f_v$ assigned to the new cell 12 is then selected, and a command is transmitted from the mobile switching center 18 ordering the mobile station 16 to handoff to the selected voice frequency in the new cell. At the same time, the mobile switching center re-routes the call from the base station 14 in the old cell 12 to the base station for the new cell.

Each base station 14 utilizes a plurality of antennas 20 for transmitting and receiving over the set of frequencies f assigned to the cell 12. In one implementation, different antennas 20 are used for transmitting and receiving. In fact, plural transmitting antennas 20t and plural receiving antennas 20r may be used in situations where poor antenna configuration exists or where are combiner limitations. For example, it is known to have the voice frequencies $f_v$ assigned to a cell 12 include a group of frequencies in a normal frequency band and a group of frequencies in an extended frequency band. In such a case, the voice frequencies $f_v$ in the normal frequency band may be transmitted by one antenna $20t_1$ of the base station 14 while the voice frequencies $f_v$ in the extended frequency band may be transmitted by a second antenna $20t_2$. The reference frequencies $f_r$ (comprising for example the control frequency $f_c$, pilot frequency and/or measurement channel) for the cell may be transmitted on one of the transmitting antennas 20t along with the voice frequencies, or may instead use their own transmitting antenna $20t_3$. Similar arrangements (although not shown) may be made with respect to the receiving antennas 20r.

In general, the cellular telephone system operates well during either call set-up or handoff to select a voice frequency $f_v$. However, the use of plural antennas 20 for transmitting and receiving over the set of frequencies f assigned to the cell 12 introduces a potential problem in the selection of a voice frequency $f_v$ during either call set-up or handoff. This problem arises when the broadcast coverage characteristics of the antenna 20 used to transmit/receive the reference frequencies $f_r$ differ from the characteristics of the antenna 20 used to transmit/receive one or more of the voice frequencies $f_v$. When different antennas 20 are used, the expected signal strength of the selected voice frequency $f_v$ for the call may dramatically differ from the measured signal strength on the reference frequency $f_r$. A call then set-up on, or handed off to, that selected voice frequency $f_v$ by the mobile switching center 18 may not be satisfactory.

The foregoing problem may be better understood with reference to FIG. 2 wherein there is shown a schematic diagram illustrating an example of the differing broadcast coverage characteristics 26 commonly experienced with the use of plural antennas 20 by cellular telephone system base stations 14. Suppose the cell 12 in which base station 14 operates is assigned use of a set of frequencies f from the cellular frequency band that include the reference frequency $f_r$ (comprising a control frequency $f_c$, pilot frequency and/or measurement channel) and a plurality of voice frequencies $f_v$ in both the normal and the extended bands. Further suppose that the base station 14 includes a plurality of antennas 20 for transmitting and receiving communications over the assigned set of frequencies. A first one of those antennas 20 comprises a transmitting antenna $20t_1$ assigned to transmit on the reference frequency $f_r$ and those voice frequencies $f_v$ in the normal band. A second one of those antennas 20 also comprises a transmitting antenna $20t_2$, but is assigned to transmit on those voice frequencies $f_v$ in the extended band only. Similar assignments are made with respect to receiving antennas (not shown to simplify the illustration) of the base station 14. Other arrangements could lead to a similar problem, for example, if the reference frequency $f_r$ is an extended voice frequency $f_v$.

The broadcast coverage characteristics 26(1) and 26(2) for the two transmitting antennas $20t_1$ and $20t_2$, respectively, differ with respect to each other within the coverage area of the cell 12. These differences in the broadcast coverage characteristics 26 for the antennas 20t may be the result of, for example, signal fading, obstruction and reflection, or perhaps other sources of interference known to those skilled in the art. For a mobile station located at point A in the cell 12 and involved in a call on a neighbor of this cell is the differences in broadcast coverage characteristics 26 for the antennas 20t is of little concern as the received signal strength at point A from either transmitting antenna, $20t_1$ or $20t_2$, is substantially the same. At point B within cell 12, however, the received signal strength substantially differs between the two transmitting antennas $20t_1$ and $20t_2$. A satisfactory signal strength measurement at point B on the reference frequency $f_r$ broadcast from antenna $20t_1$ is not necessarily indicative that a satisfactory received signal strength may be expected with respect to the voice frequencies $f_v$ in the extended band broadcast from antenna $20t_2$. Thus, mobile switching center selection of one of the voice frequencies $f_v$ in the extended band at call set-up or handoff may fail or be unsatisfactory with respect to the mobile station at point B even through the received signal strength on the reference frequency $f_r$ and the voice frequencies $f_v$ in the normal band is otherwise satisfactory.

There is accordingly a need then for a method and apparatus for use in a cellular telephone system at voice frequency $f_v$ selection during call set-up or handoff that would account for the differing broadcast coverage characteristics 26 of the plural antennas 20 used by cellular telephone system 10 base stations 14.

SUMMARY OF THE INVENTION

At either call set-up or call handoff, a determination is made as to whether the particular antenna used to broadcast a selected voice frequency in a cell is the same as that being used to broadcast a reference frequency for that same cell. If the antennas being used are not the same, consideration is given by the system to selecting an alternative voice frequency or perhaps an alternate cell. Further, a preference may be made to using voice frequencies broadcast from the same antenna as the reference frequency.

In particular, with respect to call set-up, the mobile station, using known methods, is locked onto and has selected a given cell to serve the mobile station. When a call is originated (either through an initiation or termination) with respect to the mobile station, a particular voice frequency is selected to carry the call. A comparison is then made to determine whether the selected voice frequency and the reference frequency for the serving cell are broadcast from the same antenna. If not, the system may engage in a reselection of the voice frequency, set the call up on the voice frequency and monitor for communication quality, or instruct the mobile station to search for a new serving cell. A record may also be kept by the system of cells wherein the broadcast coverage characteristics for the included multiple antennas differ. In response to a call set-up request within one of those cells, the system gives preference to the selection of voice frequencies that use the same antenna as the reference frequency.

In accordance with another aspect of the invention directed to handoff, when the antennas being used in the target cell for the reference and voice frequencies are different, a test broadcast is made on the selected voice frequency. The received signal strength for that test broadcast is then processed in view of the received signal strength on the reference frequency to confirm the selection of the target cell and use of the selected voice frequency. In the event confirmation cannot be made, the selected voice frequency is rejected in favor of another frequency, or the target cell and selected voice frequency therein are rejected in favor of choosing an alternative target cell and voice frequency. Again, a record may be kept of those cells wherein the broadcast coverage characteristics for the included multiple antennas differ. The system then gives preference at call handoff to the selection of voice frequencies that use the same antenna as the reference frequency.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 3A:
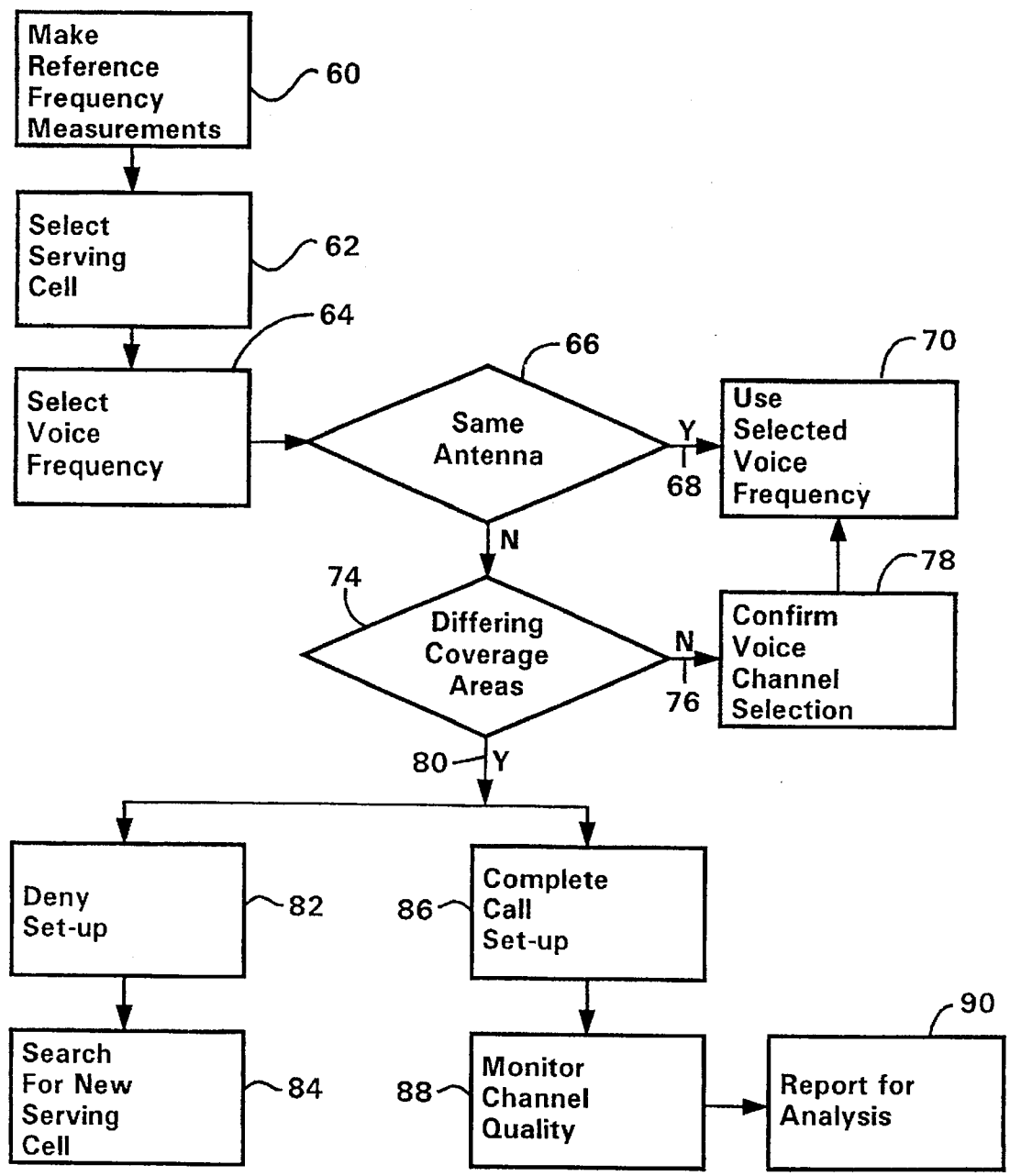
FIG. 3A is a flow diagram for cellular telephone system call set-up operation in accordance with the present invention.

Reference is now made to FIG. 3A wherein there is shown a flow diagram for cellular telephone system call set-up operation in accordance with the present invention. In step 60, the mobile station scans and makes signal strength measurements on each of the reference frequencies $f_r$ (comprising a control frequency $f_c$) for each cell, and has selected a cell as its serving cell in step 62. At call set-up, a voice frequency $f_v$ in the serving cell is selected by the mobile switching center in step 64 to carry the subscriber communication. The selected voice frequency $f_v$ is chosen from the available idle voice frequencies in the set of frequencies assigned to the serving cell. In accordance with one embodiment of the present invention, a preference is given by the mobile switching center in selecting a voice frequency that is broadcast from the same antenna as the reference frequency.

In accordance with another embodiment, a determination is then made at decision step 66 as to whether the mobile switching center selected voice frequency $f_v$ utilizes the same antenna in the base station as is used by the reference frequency $f_r$ (which in this case is the control frequency $f_c$ that the mobile station is locked on). If yes (branch 68), call set-up is further handled in a conventional manner in step 70 as is well known to those skilled in the art using the selected voice frequency. If no (branch 72), the antennas being used are different and a possibility of differing broadcast coverage characteristics exists that must be evaluated prior to confirming use of the selected voice frequency.

When the antennas being used are not the same, the mobile switching may determine in step 74 by reference to stored information whether the serving cell is a cell known for having differing broadcast coverage areas for its plural antennas. If this is not such a case (branch 76), the selected voice frequency is confirmed in step 78 and call set-up is further handled in a conventional manner in step 70 as is well known to those skilled in the art. If the cell is plagued by broadcast coverage differences (branch 80), or if no such information is maintained, the call set-up is denied in step 82 and the mobile station is forced in step 84 to search for a new serving cell. Alternatively, call set-up is completed in a conventional manner in step 86 as is well known to those skilled in the art, and the mobile station is instructed in step 88 to closely monitor the quality of the selected voice frequency and report signal strength measurements for analysis in step 90 and potential reselection of a voice frequency or handoff to another cell.

Figure 3B:
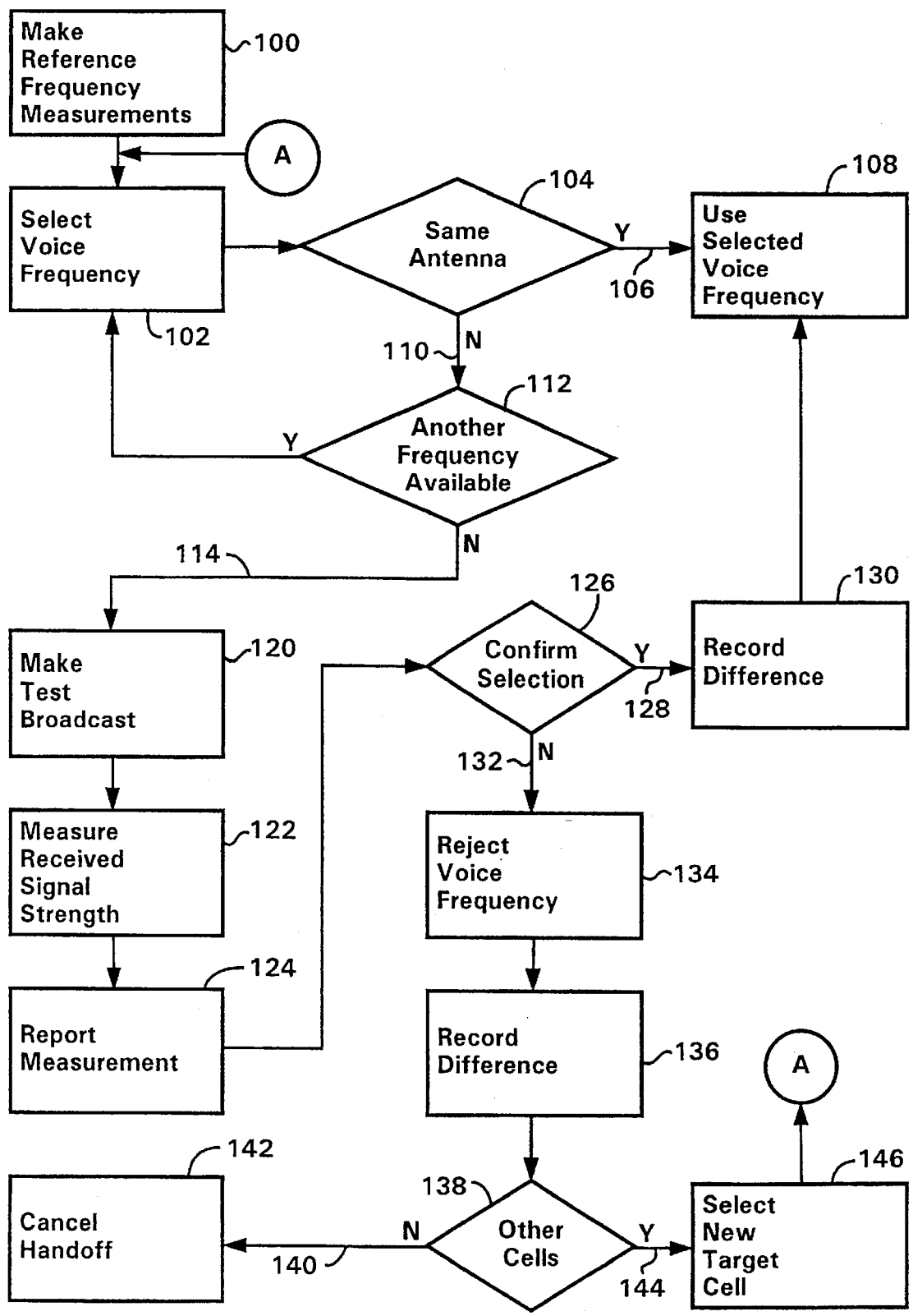
FIG. 3B is a flow diagram for cellular telephone system call handoff operation in accordance with the present invention.

Reference is now made to FIG. 3B wherein there is shown a flow diagram for cellular telephone system handoff operation in accordance with the present invention. In step 100, the mobile station scans and makes signal strength measurements on each of the reference frequencies $f_r$ comprising, for example, the measurement channels for each neighboring cell. These measurements are made when the mobile station is in operating mode for purposes of assisting in the handoff determination (MAHO). From the reference frequency $f_r$ measurements, a determination is made that a handoff is needed and a target cell (and associated base station) is selected in a manner well known to those skilled in the art. At call handoff, a voice frequency $f_v$ in the target cell is selected by the mobile switching center in step 102 to carry the subscriber communication. The selected voice frequency $f_v$ is chosen from the available voice frequencies in the set of frequencies assigned to the target cell. At this point, a check could additionally be made like that of step 74 in FIG. 3A with respect to the differing broadcast coverage areas and then proceed directly to step 108. A determination is then made at decision step 104 as to whether the mobile switching center selected voice frequency $f_v$ utilizes the same antenna in the base station as is used by the reference frequency $f_r$. If yes (branch 106), call handoff is further handled in a conventional manner in step 108 as is well known to those skilled in the art using the selected voice frequency. If no (branch 110), the antennas being used are different and a possibility of differing broadcast coverage characteristics exists that must be evaluated prior to confirming use of the selected voice frequency.

Responsive to a no determination, a determination is then made in decision step 112 as to whether another voice frequency $f_v$ is available for selection by the mobile switching center. If yes (branch 114), the new voice frequency $f_v$ is selected in step 102, and the process returns to step 104.

When that voice frequency $f_v$ utilizes the same antenna in the base station as is used by the reference frequency $f_r$, call handoff is further handled in a conventional manner in step 108 as is well known to those skilled in the art using the new voice frequency. If no (branch 118), the base station in the target cell is ordered to make a test broadcast over the previously selected voice frequency $f_v$ in step 120. The mobile station then measures the received signal strength of the test broadcast on the selected voice frequency $f_v$ in step 122, and reports the measured signal strength in step 124.

The mobile switching center then determines in decision step 126 whether the reported test broadcast received signal strength confirms the previously made target cell selection. This determination is made by comparing the test broadcast received signal strength to the control frequency received signal strength (i.e., within a predetermine deviation) and/or to a predetermined fixed threshold signal strength level. Confirmation occurs, for example, when the measured test broadcast received signal strength substantially equals the control frequency received signal strength. If confirmed (branch 128), any difference between the reference frequency $f_r$ and voice frequency $f_v$ received signal strength is recorded in step 130 (for later use in system operation refinement and maintenance), and call handoff to the selected voice frequency $f_v$ is further handled in a conventional manner in step 108 as is well known to those skilled in the art. If not confirmed (branch 132), the selected voice frequency is rejected in step 134. Any signal strength difference between the reference frequency $f_r$ and voice frequency $f_v$ received signal strength is recorded in step 136 (for later use in making system operation refinement and maintenance decisions). Following rejection, the process tests in step 138 whether any other candidate cells remain that could be selected as target cells for handoff. If no (branch 140), the handoff is canceled in step 142. If yes (branch 144), a new target cell is selected in step 146 and the process returns to step 102 to select a voice frequency $f_v$ to carry the subscriber communication in that cell. The selected voice frequency $f_v$ in this case is chosen from the available idle voice frequencies $f_v$ in the set of frequencies assigned to the selected next best target cell.

Referring now again to FIG. 3A, the steps 120–126 of FIG. 3B describing the broadcast and mobile station monitoring of a test broadcast on the selected voice frequency may also be executed in connection with a call set-up following the confirmation in step 78 of the selected voice channel.

Figure 1:
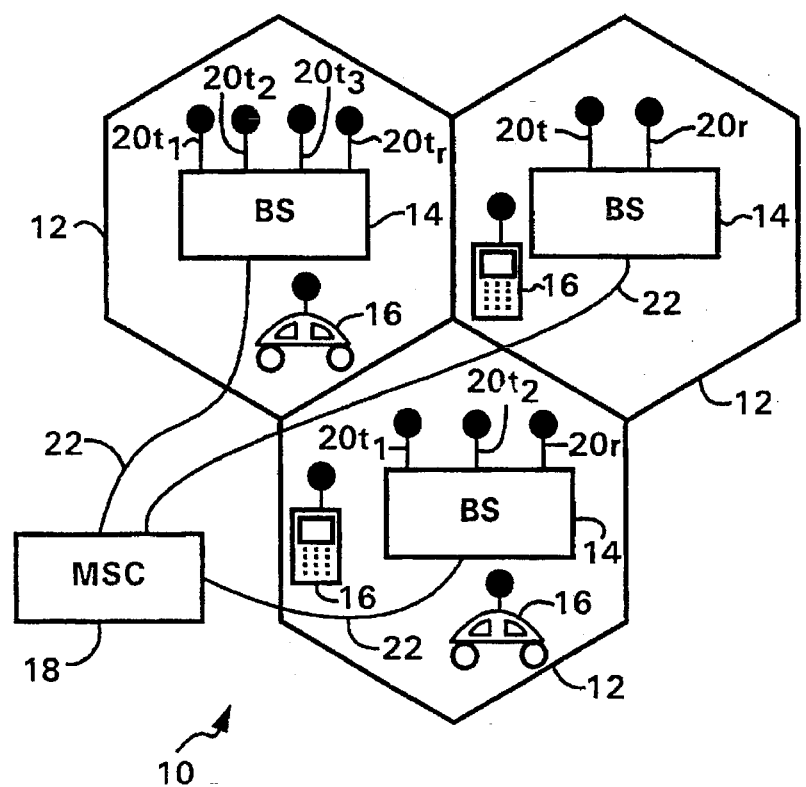
FIG. 1 is schematic view of a cellular telephone system.
Figure 2:
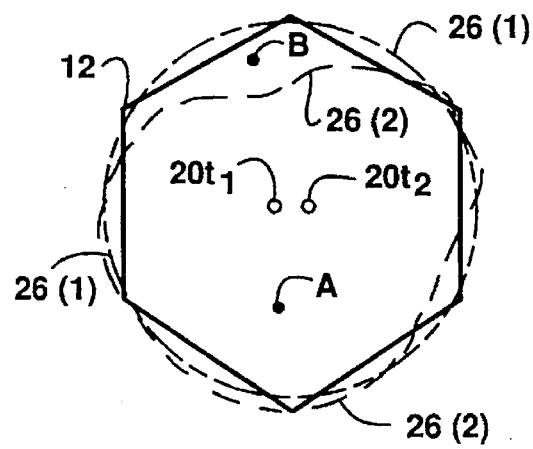
FIG. 2 is a schematic diagram of illustrating the differing broadcast coverage characteristics experienced with the use of plural antennas by cellular telephone system base stations.

Reference is now again made to FIG. 1. To implement the foregoing call set-up and handoff processes in the cellular telephone system 10, record is made in the mobile switching center 18 of an antenna number (ANTN) identifying the antennas used by each of the base stations 14 to transmit and receive each transceiver of the reference frequencies $f_r$ and voice frequencies $f_v$ within the cellular frequency band. Responsive to a call set-up or handoff request, the mobile switching center 18 selects a voice frequency $f_v$ (or time slot therein) to carry the call, and notation is made of the antenna number (ANTN) for the selected voice frequency $f_v$. In accordance with processes illustrated in FIGS. 3A and 3B, the mobile switching center 18 compares the noted antenna numbers (ANTN) for the reference frequency $f_v$ (comprising a control frequency $f_c$, pilot frequency, or measurement channel) and the selected voice frequency $f_v$.

Although the method and apparatus of the present invention has been illustrated in the accompanying Drawings and described in the foregoing Detailed Description, it will be understood that the invention is not limited to the embodiment(s) disclosed, but is capable of numerous rearrangements, modifications and substitutions without departing from the spirit of the invention as set forth and defined by the following claims.

What is claimed is:

1. A voice frequency selection method comprising the steps of:
   selecting one of a plurality of voice frequencies to carry a cellular communication in a cell;
   determining whether an antenna used by the cell for the selected voice frequency is the same as an antenna used by the cell for a reference frequency; and
   if not:
   making a test broadcast on the selected voice frequency;
   measuring received signal strength for the test broadcast;
   confirming use of the cell from a sufficient measured test broadcast received signal strength; and
   responsive to the confirmation of the cell, establishing the cellular communication over the selected voice frequency.

2. The method as in claim 1 wherein the step of selecting further includes the step of preferring selection of a voice frequency that uses the same antenna as the reference frequency.

3. The method as in claim 1 further including the step of, responsive to a determination that the same antenna is not being used, selecting an alternative voice frequency that uses the same antenna as the reference frequency.

4. The method as in claim 1 further including the step of storing a calculated difference between a received signal strength for the reference frequency and the received signal strength for the test broadcast.

5. The method as in claim 1 further including the step of, responsive to a determination that the same antenna is being used, establishing the cellular communication over the selected voice frequency.

6. The method as in claim 1 wherein the reference frequency comprises a measurement channel for use in mobile assisted handoff.

7. The method as in claim 1 wherein the reference frequency comprises a control channel.

8. In a cellular telephone system wherein a cell base station includes a first antenna and a second antenna, and wherein the first antenna operates over a reference frequency and the second antenna operates over a plurality of voice frequencies, a voice frequency selection method comprising the steps of:
   selecting one of the plurality of voice frequencies associated with the second antenna to carry a cellular communication;
   making a test broadcast over the selected voice frequency from the second antenna;
   measuring received signal strength for the test broadcast; and
   rejecting the cell base station if the measured test broadcast received signal strength is not substantially equal to a received signal strength measured for a broadcast on the reference frequency from the first antenna.

9. The method as in claim 8 wherein the first antenna operates over another plurality of voice frequencies, and the step of selecting further includes the step of preferring selection of a voice frequency that, like the reference frequency, uses the first antenna.

10. The method as in claim 8 further including the step of establishing the cellular communication over the selected voice frequency if the measured test broadcast received signal strength is substantially equal to a received signal strength measured for a broadcast on the reference frequency from the first antenna.

11. The method as in claim 8 wherein the reference frequency comprises a measurement channel for use in mobile assisted handoff.

12. The method as in claim 8 wherein the reference frequency comprises a control channel.

13. A mobile switching center for use in a cellular telephone system wherein each cell base station includes a plurality of antennas, and wherein a reference frequency and each of a plurality of voice frequencies used by the cell base stations do not necessarily use the same antenna, and wherein each reference frequency and each of the plurality of voice frequencies has an associated antenna identification number, the mobile switching center operating, responsive to a selection of one of the plurality of voice frequencies for carrying a cellular communication in a cell, to compare the antenna identification number for the selected voice frequency to the antenna identification number for the cell reference frequency and, in the event the antenna identification numbers do not match, the mobile switching center further operating to order the transmission over the selected voice frequency of a test broadcast to confirm sufficient received signal strength to support the cellular communication on the selected voice frequency.

14. The mobile switching center as in claim 13 further operating responsive to insufficient received signal strength for supporting the cellular communication on the selected voice frequency by rejecting the cell in favor of another cell in the cellular telephone system to handle the cellular communication.

15. The mobile switching center as in claim 13 wherein the reference frequency comprises a measurement channel for use in mobile assisted handoff.

16. The mobile switching center as in claim 13 wherein the reference frequency comprises a control channel.

17. A method for evaluating the quality of a selected voice frequency in a cellular telephone system in instances where a base station antenna for the selected voice frequency differs from a base station antenna for a reference frequency of a cell, comprising the steps of:
   making a test broadcast on the selected voice frequency;
   measuring received signal strength for the test broadcast; and
   rejecting the selected voice frequency if the measured test broadcast received signal strength is not substantially equal to a received signal strength with respect to the reference frequency.

18. The method as in claim 17 further including the step of rejecting the cell in favor of an alternate cell if the measured test broadcast received signal strength is not substantially equal to a received signal strength with respect to the reference frequency.

19. The method as in claim 17 further including the steps of:
   selecting an alternative voice frequency; and
   repeating the steps of claim 17 if the base station antenna for the alternative voice frequency differs from the base station antenna for the reference frequency.

20. The method as in claim 17 wherein the reference frequency comprises a measurement channel for use in mobile assisted handoff.

21. The method as in claim 17 wherein the reference frequency comprises a control channel.

* * * * *